US006785707B2

(12) United States Patent
Teeple (10) Patent No.: US 6,785,707 B2
(45) Date of Patent: Aug. 31, 2004

(54) ENHANCED MULTIMEDIA MOBILE CONTENT DELIVERY AND MESSAGE SYSTEM USING CACHE MANAGEMENT

(75) Inventor: Douglas Teeple, Kailua-Kona, HI (US)

(73) Assignee: Bitfone Corp., Laguna Niguel, CA (US)

( * ) Notice: Subject to any disclaimer, the term of this patent is extended or adjusted under 35 U.S.C. 154(b) by 539 days.

(21) Appl. No.: 09/888,080

(22) Filed: Jun. 21, 2001

(65) Prior Publication Data
US 2002/0099785 A1 Jul. 25, 2002

Related U.S. Application Data

(63) Continuation-in-part of application No. 09/713,757, filed on Nov. 14, 2000.

(51) Int. Cl.[7] .................. G06F 15/167; G06F 15/16
(52) U.S. Cl. .................................. 709/203; 709/214
(58) Field of Search ........................... 709/203, 213, 709/214, 216, 217, 218; 711/120, 121

(56) References Cited

U.S. PATENT DOCUMENTS

| | | | | |
|---|---|---|---|---|
| 6,330,617 B1 | * | 12/2001 | Bamforth et al. | 709/246 |
| 6,438,652 B1 | * | 8/2002 | Jordan et al. | 711/120 |
| 2002/0026560 A1 | * | 2/2002 | Jordan et al. | 711/120 |
| 2002/0062384 A1 | * | 5/2002 | Tso | 709/229 |
| 2002/0133537 A1 | * | 9/2002 | Lau et al. | 709/203 |

* cited by examiner

Primary Examiner—Kevin Verbrugge
(74) Attorney, Agent, or Firm—Christopher C. Winslade (57) ABSTRACT

A method and system are provided for retrieving a Web page in a multiple cache networking system. Data requested to be cached by browsers is cached among a plurality of processors in a multiple cache networking system. A request for cached data is received from a browser. A determination is made as to which of the plurality of processors are operative. A load level of each of the operative processors is then determined. Each of the operative processors is queried to locate the requested cached data. An address of the operative processor having the requested cached data is outputted.

20 Claims, 6 Drawing Sheets

ENHANCED MULTIMEDIA MOBILE CONTENT DELIVERY AND MESSAGE SYSTEM USING CACHE MANAGEMENT

CROSS-REFERENCE TO RELATED APPLICATION

This Application is a Continuation-In-Part application of, and claims priority from, U.S. patent application Ser. No. 09/713,757 entitled "Method and System for Markup Language Processing for Small Screen Format Mobile Devices" filed on Nov. 14, 2000.

BACKGROUND OF THE INVENTION

1. Field of the Invention

The present invention relates to a system and method for improved caching of data, and more particularly, to a system and method for improved caching of data for mobile devices.

2. Description of Related Art

Networking technology has developed a large network of networks, referred to as the Internet, which interconnects millions of computers around the world. The Internet allows the transfer of data between any number of computer systems connected to the Internet using the Transmission Control Protocol/Internet Protocol (TCP/IP). Computers responding to service requests from other computers, via the Internet, are commonly referred to as servers, and computers that initiate requests for service from a server are referred to as clients.

The Internet has become very popular in part due to the World Wide Web (WWW), which is a network of links to hypertext documents operating within the Internet. These hypertext documents are referred to as Web documents, Web pages, or hypertext documents. Web documents are embedded with directly accessible connections or links to other documents that create a non-linear way of reading the document. The links are embedded in Web documents as a phrase of text or an image that can be selected and activated by a computer user. Information about the Web documents are controlled and provided by Web servers. At the user's end, a Web client takes the user's requests and passes them on to the Web server.

The Web documents are written with a high level programming language referred to as the Hypertext Markup Language (HTML). Commands of the HTML, hereinafter referred to as tags, provide a variety of functions including, but not limited to, defining special format and layout information in a Web document, embedding images and sound in a Web document, and embedding links to other Web documents.

In general, each Web document is given a "Uniform Resource Locator (URL) which is essentially the address path identifying the server which hosts the desired document plus the location of the document on the server. Using a browser software, an end-user can send a request from a client computer to access a document stored at a particular URL on a server. One popular browser is Netscape Navigator. "Netscape Navigator" is a trademark of the Netscape Communications Corporation. When the server receives the user's request, it sends the requested HTML Web document to the client where the document can be displayed. The communications protocol used in making such a request and in transferring Web documents is the "Hypertext Transfer Protocol" (HTTP).

The Web document is typically displayed to an end-user of a display terminal having dimensions of 15 inches or more. Currently, many small screen devices such as mobile devices including cell phones, personal digital assistant (PDA)s, etc. now have Internet access. However, most Web sites as they currently exist are formatted only for large format personal computer ("PC") browsers. The wealth of information that is readily available on large format PCs is therefore not currently accessible to mobile users.

Small screen devices typically have small displays, for example 6 lines by 20 characters. The small displays limit the amount of information that can be presented at one time. In addition, small screen devices have limited bandwidth, generally less than 9600 baud. Transmissions must be kept to a minimum number of characters. The data buffer size of the small screen devices is typically limited to some small multiple of the number of characters that appear on the screen. Thus, most Web documents are too large to be downloaded to small screen devices.

Another problem encountered by small screen devices is that there is no standard markup language used by these devices. Japanese devices use a markup language that is incompatible with the full HTML used on the WWW. For example, the J-Phone Corporation of Japan uses Mobile Markup Language ("MML"). The NTT (Nippon Telephone and Telegraph) DoCoMo uses Compact HTML ("CHTML"), and DDI, IDO and Tu-Ka Corporations of Japan use Hand-held Device Markup Language ("HDML"). Most European and American devices use a markup language that is incompatible with HTML called Wireless Application Protocol/Wireless Markup Language ("WAP/WML") or HDML.

The different markup languages limit Internet access. Web sites that are accessible to small screen device must be compatible with the particular markup language used by the device. One prior art attempt to provide compatible sites requires human specialists to manually create and update web-sites for small screen mobile Internet devices. For example, in Japan there are a small number of i-mode-only sites for the NTT DoCoMo cell phones. The number of i-mode sites numbers in the thousands rather than the millions of sites available on the Internet as a whole. The sites are independently developed by hand and presented as i-mode-only content. For U.S. or European phones, there is a number of WML wireless Web sites, although again the content is limited and hand generated. To make an HTML Web site accessible to different types of mobile Internet devices therefore requires separate teams to create and maintain content essentially similar to the master web page but in the different markup languages.

Palm Pilot devices use a technique called "Web clipping" to provide compatible Web content. In this technique, content, such as forms, is removed if not deemed appropriate for a mobile device. There are many Web clipping applications that permit access to specific information or Web sites on the Internet. However, this method is disadvantageous not only because displayed content is limited, but because the determination of which content is appropriate for clipping can result in data of interest to the user being deleted from the Web site.

The Xift Corporation offers a précis engine for WML devices. This précis engine is used to summarize contents of a Web site for display on a mobile Internet device. However, the Xift précis engine handles only the English language and WML markup language. Oracle's Portal-to-Go provides content to mobile devices, but it is a toolkit for software developers to connect database driven Web pages to mobile devices using a particular markup language.

Pixo Corporation produces an in-phone micro browser that is located at the client that handles both HTML and WML. This micro-browser downloads large amounts of data from a Web site. The micro browser cannot use most of this downloaded data. The micro browser located at the client causes slow and bulky data transmission. Moreover, each user would have to purchase a special mobile device having the in-phone micro browser in order to take advantage of this system.

Still another problem encountered by small screen devices is the long delay in accessing Web data. In a conventional networking environment using large screen devices, users tend to view Web pages outside of their local network. Thus, Web browsers tend to reference remote pages more frequently than local pages. Because browsing produces a different locality of reference than other applications, the techniques Web browsers use to optimize performance differ from other applications. In particular, neither Web browsers nor Web servers are optimized for physical locality.

Like other applications, Web browsers use a cache to improve document access. Web browsers place a copy of each item it retrieves in a cache on a local hard disk. When a user requests data, the Web browser checks the disk cache before retrieving a fresh copy of the requested data. If the cache contains the item, the Web browser obtains the copy from the cache and the Web browser only contacts the origin server (i.e., the server that owns the data) if the data cannot be found in the cache. Keeping items in a cache can improve performance dramatically because a browser can read data from a disk without waiting for network delays.

Despite the large improvements in speed in retrieving data, today's network architecture is not equipped to avoid wasteful duplication and processing associated with delivery of multimedia to small screen devices, such as mobile Internet devices. Previously, the problem of load balancing (i.e., the use of processor resources in the retrieval and delivery of data to users) had been to route a request for the retrieval of data to a server with the lightest load, with no knowledge as to whether the requested data already exists in cache on another server. The result is that more than one server has the same cached data.

It would therefore be an advantage to provide a method and system for retrieval of cached data to be displayed on small screen devices in an efficient manner.

SUMMARY OF THE INVENTION

A method and system are provided for retrieving a Web page in a multiple cache networking system. Data requested to be cached by browsers is cached among a plurality of processors in a multiple cache networking system. A request for cached data is received from a browser. A determination is made as to which of the plurality of processors are operative. A load level of each of the operative processors is then determined. Each of the operative processors is queried to locate the requested cached data. An address of the operative processor having the requested cached data is outputted.

BRIEF DESCRIPTION OF THE DRAWINGS

The accompanying drawings, which are incorporated in and form part of the specification, illustrate embodiments of the invention and, together with the description, serve to explain the principles of the invention.

DETAILED DESCRIPTION OF THE INVENTION

A method and system for provided for retrieving a Web page in a multiple cache networking system is disclosed. Data requested to be cached by browsers is cached among a plurality of processors in a multiple cache networking system. A request for cached data is received from a browser. A determination is made as to which of the plurality of processors are operative. A load level of each of the operative processors is then determined. Each of the operative processors is queried to locate the requested cached data. An address of the operative processor having the requested cached data is outputted. According to the present invention, the load level of the operative processor having the requested cached data is compared to a predetermined threshold value. If the load level of the operative processor having the requested cached data exceeds the predetermined threshold value, an address of the operative processor having the lowest load level is outputted.

A description of automatic reformatting of data for display on small screen devices is first described followed by a description of retrieving Web pages in a multiple cache networking system. It will be evident that the retrieval of Web pages in a multiple cache networking system can be utilized in the automatic reformatting data for display on small screen devices as described below. The multiple cache networking system allows for two distinct improvements. First, the cache system allows for retrieval of data stored locally. This provides a faster response time for retrieving data than data stored in a remote cache. Second, the data stored locally is compressed which also reduces processing time.

In the following description, for purposes of explanation, numerous specific details are set forth in order to provide an understanding of the present invention. It will be evident, however, to those of ordinary skill in the art that the present invention can be practiced without the specific details. In other instances, well-known structures and devices are shown in block diagram form to facilitate explanation. The description of preferred embodiments is not intended to limit the scope of the claims appended hereto.

For purposes of description, the term "small screen display devices" will be used to refer to an electronic device having a small display screen and in communication with an electronic network, including but not limited to the Internet. However, the teachings herein can be applied to any appropriate small display screen device, including mobile Internet devices and devices that are not mobile, such as an Internet-capable phone. The use of the term small screen display device is therefore for descriptive purposes only and is not intended in any way to limit the scope of the invention as claimed herein.

One skilled in the art using well-known hardware components can implement any or all of the hardware configurations of the present invention. In the presently preferred embodiment, the present invention is implemented using at least one computer. Such computer can include but is not limited to a personal computer, network computer, network server computer, dumb terminal, personal digital assistant, work station, minicomputer, a mobile Internet device such as a cell phone, and a mainframe computer, as well as one or more computers that are linked together in a network such as a local area network, or wide area network. For example, the identification, reformatting, parsing and/or processing features of the present invention can be implemented as one or more software applications, software modules, firmware such as a programmable ROM or EEPROM, hardware such as an application-specific integrated circuit ("ASIC"), or any combination of the above.

Figure 1:
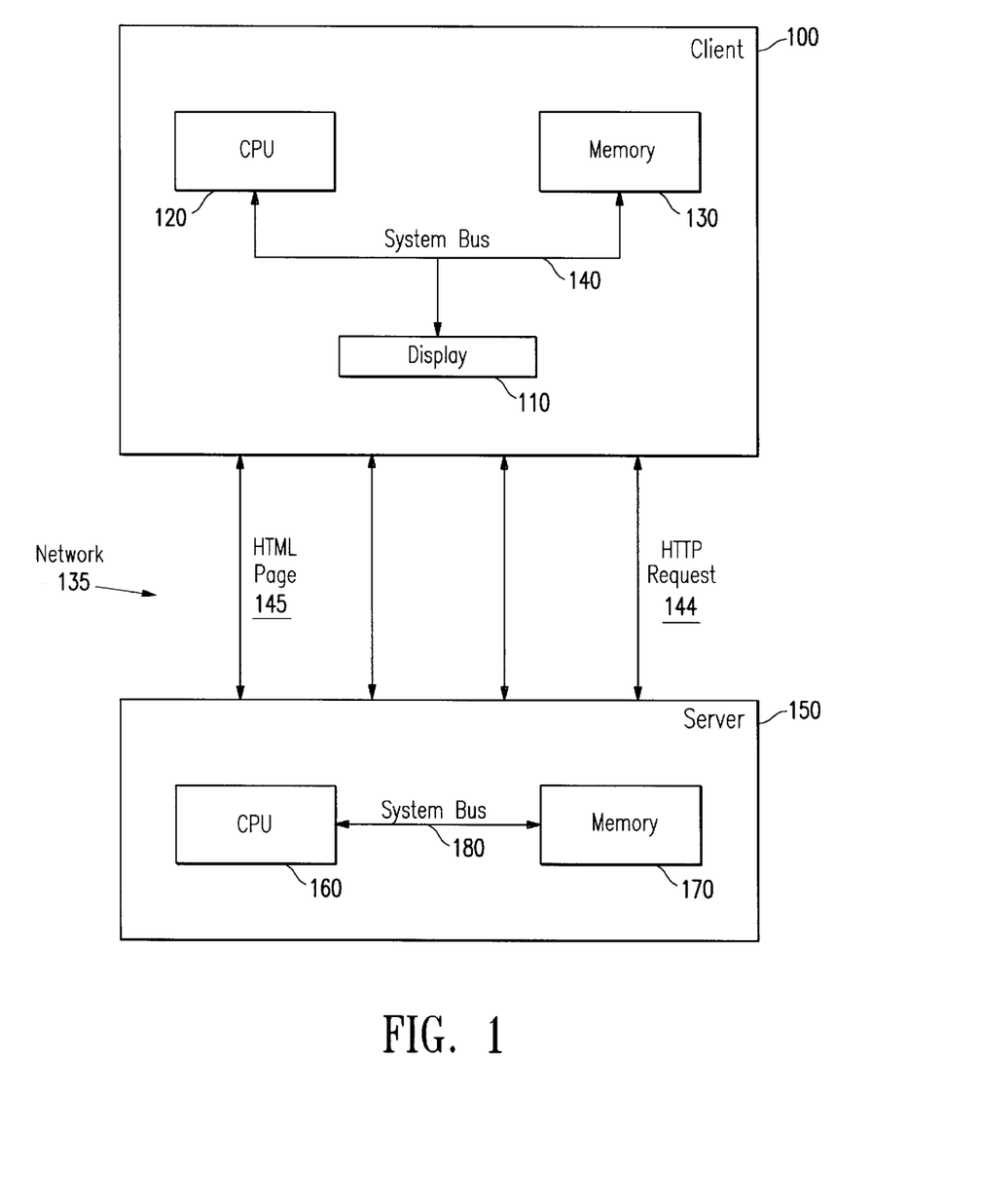
FIG. 1 is a high level architectural view of a Web connection between a client system and a server system.

Reference is made to FIG. 1 illustrating a high level architectural view of a Web connection between a client system and a server system. In FIG. 1, a client system 100 consists of a Central Processing Unit (CPU) 120, a memory 130, and a display 110 which are connected together by a system bus 140. Memory 130 stores browser software to communicate with server system 150. It will be understood by a person of ordinary skill in the art that client system 100 can also include other elements not shown in FIG. 1 such as disk drives, a keyboard, etc. Server system 150, on the other hand, includes a CPU 160 and a memory 170 which are connected together by a system bus 180. Memory 170 stores HTTP server software and may also store a set of programs implemented in accordance to one embodiment of the present invention. A person of ordinary skill in the art will understand that memories 130 and 170 may also contain additional information such as application programs, network communication programs (e.g., TCP/IP protocol), operating system software, data, etc. Client system 100 and server system 150 are linked together by a network 135.

In an exemplary exchange, an end-user uses client system 100 to execute a browser program stored in memory 130 to request, retrieve, and display network documents such as Web pages. Each request by client system 100 for retrieval of a network document is formulated in accordance with the network protocol (e.g., HTTP) and transmitted across network 135 to server system 150. Server computer 150 receives HTTP requests such as request 144 and processes them using the HTTP server software (e.g., standard network server software) stored in memory 170. The HTTP server software of server system 150 then instructs CPU 160 to retrieve HTML page 145 from data stored in memory 170 and to transmit a copy of HTML Web page 145 back to client system 100 for display on display 110.

Figure 2:
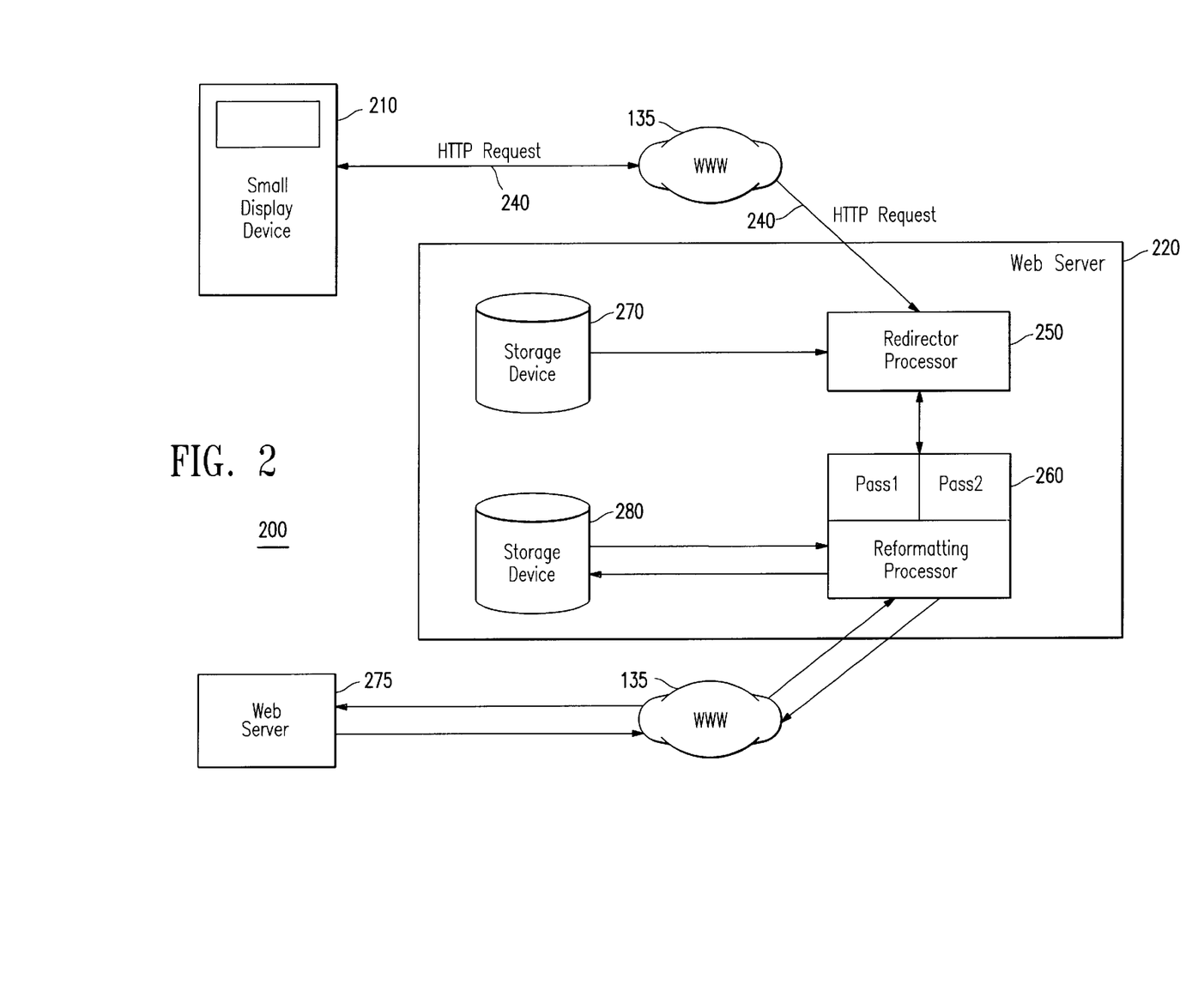
FIG. 2 is a block diagram of the system for customized reformatting of data according to one embodiment of the present invention.

FIG. 2 is a block diagram of a system 200 for customizing the presentation of data according to one embodiment of the present invention. As shown in FIG. 2, client system 210 which is an Internet-enabled device such as a small screen display device accesses system 200 according to the present invention through an electronic network such as the World Wide Web ("Web") 135 by sending a Hyper Text Transfer Protocol ("HTTP") request 240 containing a Universal Resource Locator ("URL") request to a Web server 220. Web server 220 includes a redirector processor 250, storage devices 270 and 280 and reformatting processor 260. The system according to one preferred embodiment of the present invention includes at least one, and preferably a plurality of interpretive language software programs used for active Web documents. Popular interpretive language software programs include JAVA SERVLET, JAVABEAN and JAVA SERVER PAGE (JSP) ("JAVA SERVLET", "JAVABEAN" and "JAVA SERVER PAGE" are all trademarks of Sun Microsystems, Inc.). In one preferred embodiment of the present invention, the JSP functions as a redirector processor or alternatively multiple servers can be used, as will be described in further detail. One of skill in the art will recognize that the invention can alternatively be implemented in other well-known programming languages. In one preferred embodiment of the present invention, when a request for a particular Web site is made, the system initially reformats the data into data written an intermediate markup language data during a first pass. On a second pass, the data is further processed according to a specific rule set for the corresponding mobile device and sent to the requesting mobile device.

The HTTP request 240 sent by the client device 210 includes a user-agent header. The user-agent header includes a unique device signature assigned to client device 210. In general, every device, connected to the Internet is assigned a unique device signature by the manufacturer. HTTP designates a user and agent header (user_agent:<string>) which based on information the system selects a rule set and determines which rule to apply.

An identifier entry is stored in database 270 which represents the device signature for each client device connected to the Internet. The identifier entry is a character string that is used to determine the device accessing the invention from the user agent field in the HTTP header.

According to one embodiment of the present invention, device characteristics are also stored in database 270. Database 270 may be located separate and remote from other systems components such as the redirector processor or the reforming processor. However, in alternative embodiments, the device characteristics can be stored as a part of the reformatting processor. In a preferred embodiment of the present invention, each client device connected to the system has a separate entry and name in database 270. Additional entries in database 270 give formatting hints for the reformatting processor, including but not limited to the screen height and width for pagination, whether the device can handle images, and whether the client device can support color or black and white. The signature is thus used to find the client device's identification information, including but not limited to model, screen dimensions and characteristics such as color capabilities and graphics capabilities. The signature is also used to find a rule set that will be used in processing the requested markup language ("ML") data. The ML used by the device is stored in database 270, so once the signature is known, then the ML it uses is also known.

Redirector processor 250 redirects HTTP request 240 from client system 210 to database 270 to retrieve the ML and the device characteristics. The redirector processor 250 then sends back to the requesting client device 210 the identification information as well as a text input area for receiving the URL to be processed by the redirector processor 250. In other embodiments of the present invention in which the URL is fixed and known, the identification information as well as a text input area for receiving the URL is not returned to the device 210, and the redirector processor 250 begins processing immediately.

Because the rule set for the requesting client device 210 is known, the redirector processor 250 sends the user a request asking for the Web site the user desires. The user of the client device 210 enters the URL to be visited. The URL of the requested Web page, the device characteristics, and any additional information are sent to the reformatting processor 260 for processing. The reformatting processor 260 communicates with storage device 280 which has stored therein other processing information.

The system then sends the URL to the remote Web server 275 for the Web site represented by the URL and requests that ML source data from the selected Web site be returned to the reformatting processor 260. This step is accomplished in a two-pass operation where the first pass includes storing the ML source data in an intermediate markup while the second pass includes converting the stored data into data written in a markup language designated by the client device 210. The reformatting processor 260 receives the ML source data from the remote Web Server 275. If the requesting client device 210 is capable of displaying a large screen format browser, the reformatting processor 260 sends the ML source data to the redirector processor 250 which, in turn, forwards the ML source data to client system 210, with no further intervention by the reformatting processor 260. Otherwise, the reformatting processor 260 reformats the ML data in accordance with the rule set that has previously been selected for the format used by the identified requesting client device 210 stored in storage device 280. The reformatting processor 260 then sends the reformatted ML source data to the redirector processor 250 and finally through the network 135 back to the requesting client device 210.

The software applications that are used with the present invention can be stored on any storage device accessible to the computer(s) of the system, including but not limited to a hard drive, CD-ROM, DVD, magnetic tape, optical drive, programmable memory device, and Flash RAM. It will be readily apparent to one of skill in the art that the software applications can be stored on the same or different storage devices.

The reformatting processor 260 is a tag-by-tag ML rewriting processor that applies external rule sets to ML source data. In accordance to one embodiment of the present invention, the processor handles multiple rule sets simultaneously, applying the particular rule set as required by the requesting client device 210. The rule sets are preferably stored externally to the processor and are interpreted dynamically. Alternatively, the rule sets can be stored as a part of the reformatting processor 260. Rule classes preferably capture entire families of devices (e.g. WML-class, CHTML-class). The rules that are included in these rule sets encapsulate a rewriting language that can be used, for example to rewrite HTML into WML while preserving the formatting of forms. Rule sets can also be specialized for a particular device. A device can use a rule class as well as specific rules in the device's rule set. The generic rules are augmented by the specific rules.

Because Web sites typically have more variability in styles than small screen display devices, the preferred embodiment of the invention uses Web site-specific rules as well as format-specific rules. Web site rules are always applied before format-specific rules. Web site-specific rules can be designed, for example, to enhance the particular Web site experience, or to provide customization to maintain a particular look and feel. As an example, a Web site formatted for the PC frequently has a series of navigation links at the top of the screen. When a Web site is reformatted for a small screen device, it can be advantageous to move these navigation links to the bottom of the screen, so that the actual content appears first. The invention is not limited to this example, but rather provides a method whereby such examples may be implemented.

Figure 3:
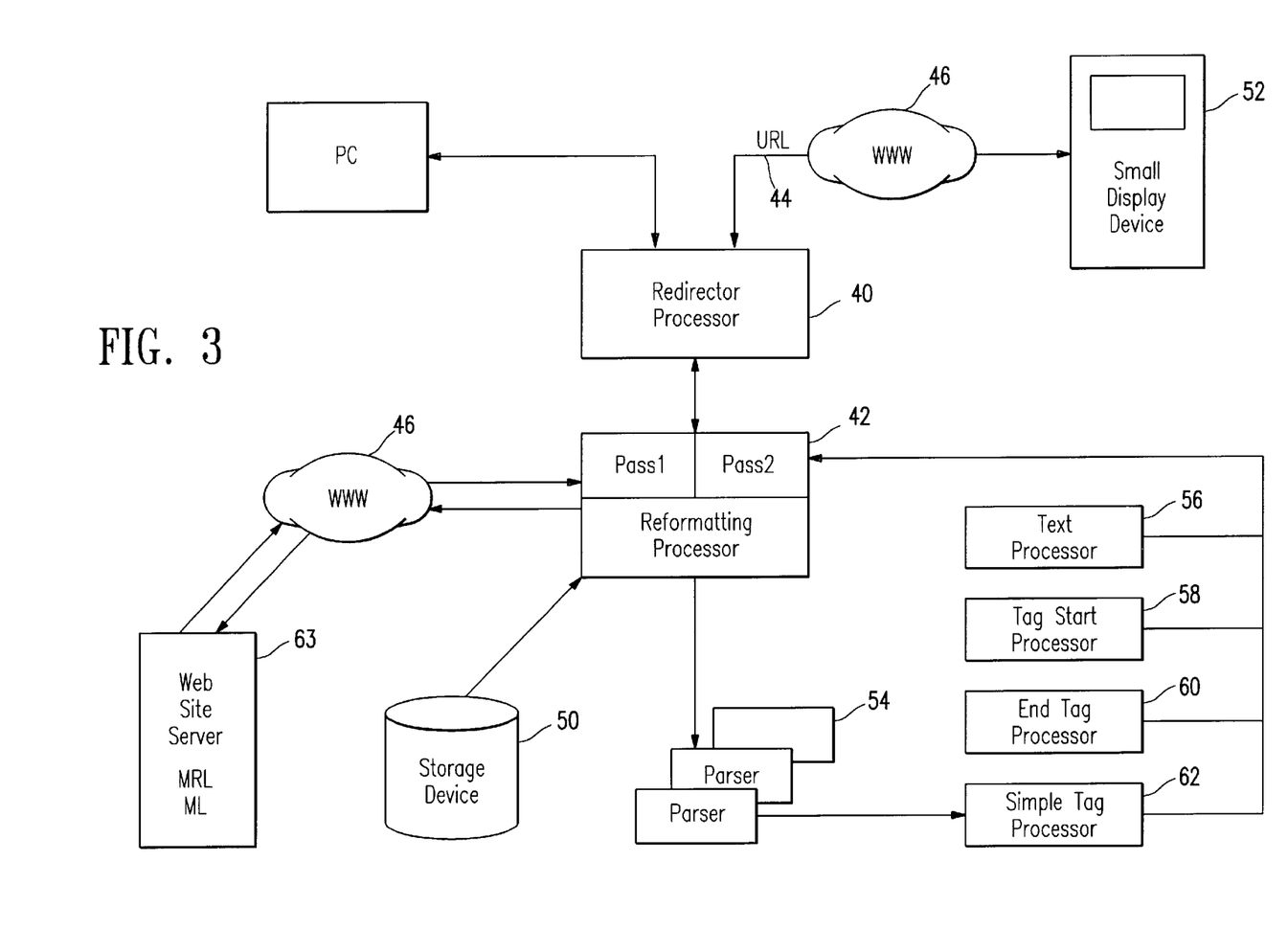
FIG. 3 is a system flow chart of the system for customized reformatting of data according to one embodiment of the present invention.

FIG. 3 is a system flow chart of the system for customized reformatting of data according to the present invention. A redirector processor 40 receives, from a mobile Internet device 52, a Universal Resource Locator 44 indicating a Web page to be reformatted for display on the requesting device 52. A redirector processor 40 checks the requesting mobile Internet device's identification information and sends the identification information and the URL to a reformatting processor 42. The reformatting processor 42 reads in the ML reformatting rules 50 associated with the requesting device 52 and passes these rules to a ML parser processors 54.

The reformatting processor 42 communicates with Web site server 63. The reformatting processor 42 sends the URL identified therein, requesting that ML data be returned to the reformatting processor 42. In response to this request, the requested ML source data is returned from the Web site server 63 via network 46 to the reformatting processor 42 and then sent to the ML parser processors 54. The ML parser processor 54 processes the ML source data from the Web site and calls associated processors 56, 58, 60, 62 depending on the tag type for further processing. ML tags identifying formatting options are classified into 4 types: plain text 56, start tag 58, end tag 60, and simple tag 62. Each of the processors then processes the data embedded in each respective tag type, applying the reformatting rules to each tag as it is read. The rule associated with each tag is applied and the result is reformatted as an intermediate ML. The intermediate ML is reformatted via reformatting processor 42 into device specific ML that was identified by the mobile Internet device 52 and the reformatted data is sent for display on the mobile Internet device 52. For example if the user has an i-mode phone and wants to view a WAP site, the system would retrieve the WAP ML site data from a remote server and then as an intermediate step compress, reformat and store the data in a cache. Since the requesting device is an i-mode device, the ML would parse the data once more into CMTL for i-mode display. Assuming this step has taken place (the storage of data from a WAP site), an identical request for the same Web site can be made from a J-Phone device. Rather than retrieve the data from a remote server having the desired Web site data as before, the system would query its cache to determine if the requested data is stored therein. If the data has been stored in the cache, the system retrieves the stored data that has been compressed and reformatted in the intermediate ML. The system would then merely apply the J-phone's rule set for displaying the data on its small screen.

Having the data stored in the system's cache saves an entire processing step because the system does not have to retrieve the data from a remote Web server.

Figure 4:
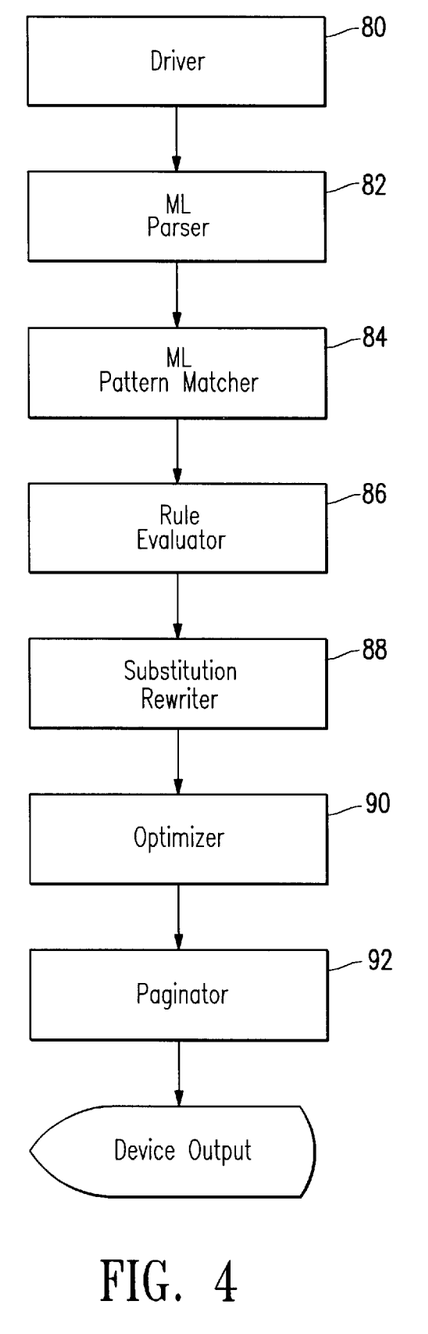
FIG. 4 is a block diagram of the reformatting processor according to one embodiment of the present invention.

FIG. 4 is a block diagram of the reformatting processor according to the preferred embodiment of the invention. The components of the reformatting processor include:

a driver 80;

a ML parser 82;

a ML tag pattern matcher 84;

a rule evaluator 86;

a substitution rewriter 88;

an optimizer 90; and a paginator 92.

Driver

The driver 80 establishes a connection to the Web site represented by the requested URL, and opens a connection to retrieve the requested ML source data from the Web site. The driver locates the rule set that is to be used with the requesting device, and passes this information on to the markup language parser. The ML parser reads the stream from the site and identifies the specific tags for processing. The ML parser reads byte streams from the designated site and breaks up the bytes that can be interpreted by the reformatter. Different ML parsers are required for different sites. For instance, bytes will represent different tags based on the ML deployed by the carrier and the carrier's peculiar specifications. Consequently ML parsers are specialized to each markup language and then specialized further to the particular carrier.

ML Parser

Control is then passed to the ML parser 82, which breaks the ML source data into the constituent elements referred to herein as the , namely: for each of the start tag, the end tag, the simple tag and the text element. These four constituent elements comprise the content of MLs processed by the system ML Tag Pattern Matcher Each tag from the ML source data is passed to the ML tag pattern matcher 84. The ML tag pattern matcher uses a pattern-matching algorithm to match rules by sequentially testing each rule, for example, starting from rule 1, until a match is found. The tag pattern matcher commits to the first matching rule, if any, and the pattern-matching process is terminated. The matching process is described herein, below. Rule heads, defined for purposes herein as all text to the left of the symbol "→" in a rule, can contain variables or sequences of variables which match and bind with the incoming ML, as will be described herein in more detail, below.

In the preferred embodiment of the present invention, rules are expressed as text in a computer language, called the Mobile Rule Language (MRL). While the invention is described herein with respect to the preferred MRL, one of skill in the art will recognize that, in alternative embodiments, other suitable computer languages can be used. In the preferred embodiment of the present invention, rules written in the MRL are of the form:

rule head→rule body

The "head" or "rule head", which comprises all characters to the left of the symbol "→", is matched against the incoming ML through pattern matching substitutions. The "body" or "rule body" of the rule comprises all characters to the right of the "→" symbol.

For example, in the rule:

<HTML>→<wml> the <HTML> tag is replaced with a <wml> tag. Tag attributes can be matched through patterns. A tag attribute is a series of letters followed by an "=" sign, followed by any characters, with the exception of the ">" character. The ML tag pattern matcher identifies a pattern by starting with the "@" sign (which is optionally followed by at least one other "@" sign), followed by a number that uniquely identifies that matched pattern. For example, in the rule:

<img src=@1 alt=@2>→>@2 the img tag "alt attribute value", (the value to the right of the "=" sign), is assigned to the pattern match uniquely identified by the symbols "@2". The rule body replacement value is identified as "@2" (the symbols to the right of the "→" symbol).

For example, when matched against HTML, input source such as:

<img src=mypic.jpg alt="My picture"> matches the rule:

<img (? src=@1 alt=@2 ?)>→>@2 with the result that the variable @1 would be bound to "mypic.jpg" and the variable @2 bound to "My picture". Thus, the text "My picture", which is the rule body, replaces the HTML input source.

In the presently preferred embodiment, pattern variables of the form:

@<small integer> bind once within a rule and have scope only within that rule. Once bound, these variables are not rebound. As has been discussed previously, once one rule head is matched, there is no attempt to locate another matching rule. Another variable that can be used in rules is the anonymous variable @, which matches any of number of times within the rule, but whose binding value is not available. Yet another such variable is @@, which is anonymous and matches any text. The anonymous variable @ is used if the value bound is not required. The variable @@ is used to discard input or to match any unknown number of attributes whose names and values will not be used. Additionally, the construct (? . . . ?) is the alternating construct that allows the attribute/value pairs contained therewithin to be matched in any order.

Rule Evaluator

When a match for the rule head is found, all variables, for example "@1", "@2", are bound as has been previously described. The right hand side portion of the rule, the rule body, is then executed by the rule evaluator 86. The rule evaluator is a stack-based interpreter that can perform conditional evaluation and simple counting/logic functions. The interpreter for the MRL can be written in any computer language, however, the preferred embodiment is written in Java. The evaluator is a stack-based interpreter.

Operators of the MRL can include well-known arithmetic and Boolean operators such as the addition operator, expressed in the MRL as the symbol "+". The entire set of operators will be detailed in Tables 1, 2, and 3. In the preferred embodiment, strings are character sequences that can be in three forms:

1. 'any characters'
2. "any characters"
3. <any characters>

The first form is a constant string in which variables within the string are not evaluated. In the second string form, variables within the string are evaluated. In the third form, variables within the string are also evaluated but the delimiters < and > are retained after evaluation.

For example, assuming the variable @2 is bound in the rule head to myPic.jpg, the value of:

'@2' is @2

The value of:

"@2" is myPic.jpg

Assuming the variable @2 is bound to http://www.sun.com, the value of:

<a href=@2> is <a href=http://www.sun.com>

Substitution Rewriter

After a match is made for the head of the rule has been determined, the MRL evaluator generates a string result by evaluating the rule body. The substitution rewriter 88 is then used to replace the original ML. As each tag is read, the rewritten HTML is accumulated by the reformatting processor. When the entire web page has been processed, the accumulated rewritten ML is passed on to the Optimizer 90.

The right hand side of a rule can contain expressions such as conditional constructs. A conditional construct is one that is executed by the interpreter conditionally, depending on the truth value of the expression to the left of a conditional operator. In the presently preferred embodiment, the conditional operators are represented by the symbols "?" and "??". A list of language constructs according to the preferred embodiment of the invention is shown in tables 1, 2, and 3. For explanatory purposes only, the following examples show relevant constructs according to the invention.

Mobile Rule Language (MRL) Construct Summary

The Mobile Rule Language (MRL) is a simple stack-based language with variables, conditional constructs and some numeric and string manipulation capability. Language entities are:

TABLE 1

OPERATORS

| Operator | Precedence | Value |
|---|---|---|
| <expr1>??<result> | 3 | if <expr> is true return <result> else null |
| <expr>?<result1>:<result2> | 3 | if <expr> is true return <result1> else return <result2> |
| <expr1>==<expr2> | 5 | return false if <expr1> equals <expr2> else true |
| <expr1>!=<expr2> | 5 | |
| !<expr> | 9 | return false if <expr> is true else true |
| <expr> ; <expr> | 2 | go on to next expr, leaving result on stack |
| @<name>=<expr> | 7 | Assign value of <expr> to variable @<name> |
| @<name>++ | 9 | Increment value of variable leaving prior value on stack |
| <string> + <string> | 4 | Concatenate strings |
| <string> <string> | 4 | Concatenate strings merging absolute URLs |
| <number> + <number> | 4 | Add numeric values, leave result on stack |
| <number> − <number> | 4 | Subtract numeric values, result on stack |
| <number> * <number> | 5 | Multiply numeric value, result on stack |
| <number> / <number> | 5 | Divide numeric values, result on stack |
| <expr1> >= <expr2> | 3 | return true if <expr1> is numerically greater than or equals <expr2> else false |
| <expr1> <= <expr2> | 3 | return true if <expr1> is numerically less than or equals <expr2> else false |
| <expr1> > expr2> | 3 | return true if <expr1> is numerically greater than <expr2> else false |
| <expr1> < <expr2> | 3 | return true if <expr1> is numerically less than <expr2> else false |

TABLE 2

VARIABLES

| Variable | Explanation |
|---|---|
| @ | Anonymous variable matching one attribute or value |
| @@ | Anonymous variable matching any number of attribute/value pairs |
| @<small int> | Pattern variable scoped to single rule |
| @<name> | Named variable scoped to entire page |
| (??) | Alternating match, enclosed attribute/value pairs matched in any order |

TABLE 3

CONSTANTS

| Value | Explanation |
|---|---|
| true, false | Boolean constants |
| 0, 1, . . . 9* | Numeric decimal constants |
| name(arg[, arg]*) | Function call |
| ' character* ' | Non evaluating string |
| " character* " | Evaluate-in string |
| < character* > | Evaluate-in string |

Optimizer

An optimizer 90 is used to parse the resultant output ML and optimize it to minimize the size of its useful content. The optimizer removes extraneous content which is not useful and which slows the content download time to the device. The optimizer does not, however, remove viewable content. The output rewritten ML is preferably optimized in two passes, removing empty elements that may have been created by rule application. However, in alternative embodiments, any appropriate number of optimizing passes can be used. Examples of such empty elements include <BR><BR> sequences, empty paragraphs <P></P> and empty font changes <FONT></FONT>. The optimized result is a very compact file that can be sent to the device at very high-speeds because of its small size. In the preferred embodiment, a copy of the optimized result can also be stored in one or more cache memories. In this embodiment, when a device of the same type accesses the same URL this optimized output can be retrieved directly from the cache.

Paginator

The paginator 92 breaks the optimized result into a series of pages that fit the screen size of the requesting device. Page forward, home and page back links are added to the bottom of the screen. The current page number and last page number are also added. The requested Web page is than sent out to the device in a short burst of text or compiled device markup language.

Example 1 illustrates exemplary identifier and formatting entries according to the preferred embodiment of the invention.

EXAMPLE 1

```
// Devices
//
// Add a phone or device by giving it a unique entry as below,
// serially to the end of the list.
//
// system.phone.name          is a unique arbitrary name for the device
// system.<name>.identifier   the identification signature passed in
//                            the http User-Agent field
// system.<name>.width        the screen width in characters
// system.<name>.height       the screen height in characters
// system.<name>.color        true if the device supports color,
//                            else false
// system.<name>.images       true if the device supports gif images,
//                            else false
// system.<name>.description  a brief description of the device
//
```

Sites are also identified in the system properties file 22 for determining site rules. Exemplary entries in the properties file can be used to:

add a site by giving it a unique identifier;

add it serially to end of list; and add the site URL to identify the site.

The sites that have specific site rules are identified and the URL is used as a signature. Each device and site that is named in the system property file has a property file of the form:

System.<name>properties, where <name> is the device name or the site name.

Example 2 illustrates site rewriting rules according to the preferred embodiment of the invention. The Example shows exemplary site rules for the TEST1 site. This site has a frame front page. The processing of HTML is simply redirected to the content frame whose name is "TEST2", by following the second frame link.

EXAMPLE 2

```
system.rule.TEST1.1=<FRAME (?SRC=@2 NAME=@3?)
> -> (@3=="TEST2")??
@location="@MyURL@2"
system.rule.TEST1.2=</@@>-></@1>
system.rule.TEST1.3=<@@>-><@1>
```

Example 3 illustrates the use of rule classes. In this Example, the only rule needed to capture the device capabilities is the CHTML version 2.0 rules. Devices can explicitly list all rules, list specific rules and then reference rule classes, or may simply reference rule classes. This Example provides exemplary device rewriting rules according to the CHTML version 2.0 rule class:

EXAMPLE 3

```
system.rule.CHTML20.1=<HTML version=@1>-><HTML>
system.rule.CHTML20.2=<HEAD>-><HEAD><META HTTP-EQUIV="content-type"
CONTENT="text/HTML; charset=x-sjis">
...
system.rule.CHTML20.12=<MARQUEE (?behavior=@2 direction=@3 loop=@4?)> ->
(@4>16)?<MARQUEE behavior=@2 direction=@3 loop=16>:<MARQUEE
behavior=@2 direction=@3 loop=@4>
...
system.rule.CHTML20.107=<AREA (?alt=@2 href=@3?)>->(@3!="")?<BR><A
HREF=@BASEURL@MyURL@3>@2</A>:@2
...
system.rule.CHTML20.112=<OPTION (? VALUE=@2 ?)>-><BR><A
href=@BASEURL@MyURL@2 ACCESSKEY=@n>;@n++
system.rule.CHTML20.113=<OPTION>-><BR>
system.rule.CHTML20.114=</OPTION>-></a>
system.rule.CHTML20.115=<FRAMESET@@>-><HR><CENTER><FONT
COLOR=MAROON>Menu</FONT></CENTER><HR><OL>
system.rule.CHTML20.116=</FRAMESET>-></OL><HR>
system.rule.CHTML20.117=<FRAME (?SRC=@2 NAME=@3?)>-><LI><A
href=@BASEURL@MyURL@2>@3</A>
system.rule.CHTML20.118=<NOFRAMES>->
system.rule.CHTML20.119=</NOFRAMES>->
...
system.rule.CHTML20.134=</@@>-></@1>
system.rule.CHTML20.135=<@@>-><@1>
```

The last two exemplary rules of Example 3 are "catch-all" rules that pass though any tag, untouched.

In general, the present invention discloses a method and system for customizing the presentation of Web site data for display on small screen display devices, such as mobile Internet devices. The user of the small screen display device sends a Hyper Text Transfer Protocol ("http") request to a first World Wide Web server site implementing the system according to the present invention. This http request is transmitted to a redirector processor. The redirector processor determines the signature of the requesting device and is thereby able to identify device characteristics, such as the type of markup language used by the device, as well as the device's screen dimensions, graphics capability, and graphical characteristics. A rule set for use in processing data requested by the requesting device is thereby determined. In addition, stored customized reformatting parameter are also retrieved for processing data.

In an alternative embodiment, the redirector processor transmits back to the requesting device a text input area in the markup language used by the device. The user can then enter into this text input area a URL representing a Web site that the user wishes to access. The request for access to the site represented by the URL as well as the identified device characteristics information is transmitted to a reformatting processor. The reformatting processor sends a request for data to the remote Web server for the Web site represented by the URL.

If the identified device characteristics indicate that the requesting device is a small format device, the reformatting processor reformats the data received from the remote Web server in accordance with the determined rule set. The received data is transmitted from the reformatting processor to the first Web server for transmission to the requesting device. If the requesting device is identified as a large format device, the reformatting processor transmits the received data without reformatting. The data from the Web site represented by the URL can thereby be displayed on the requesting device.

Figure 5:
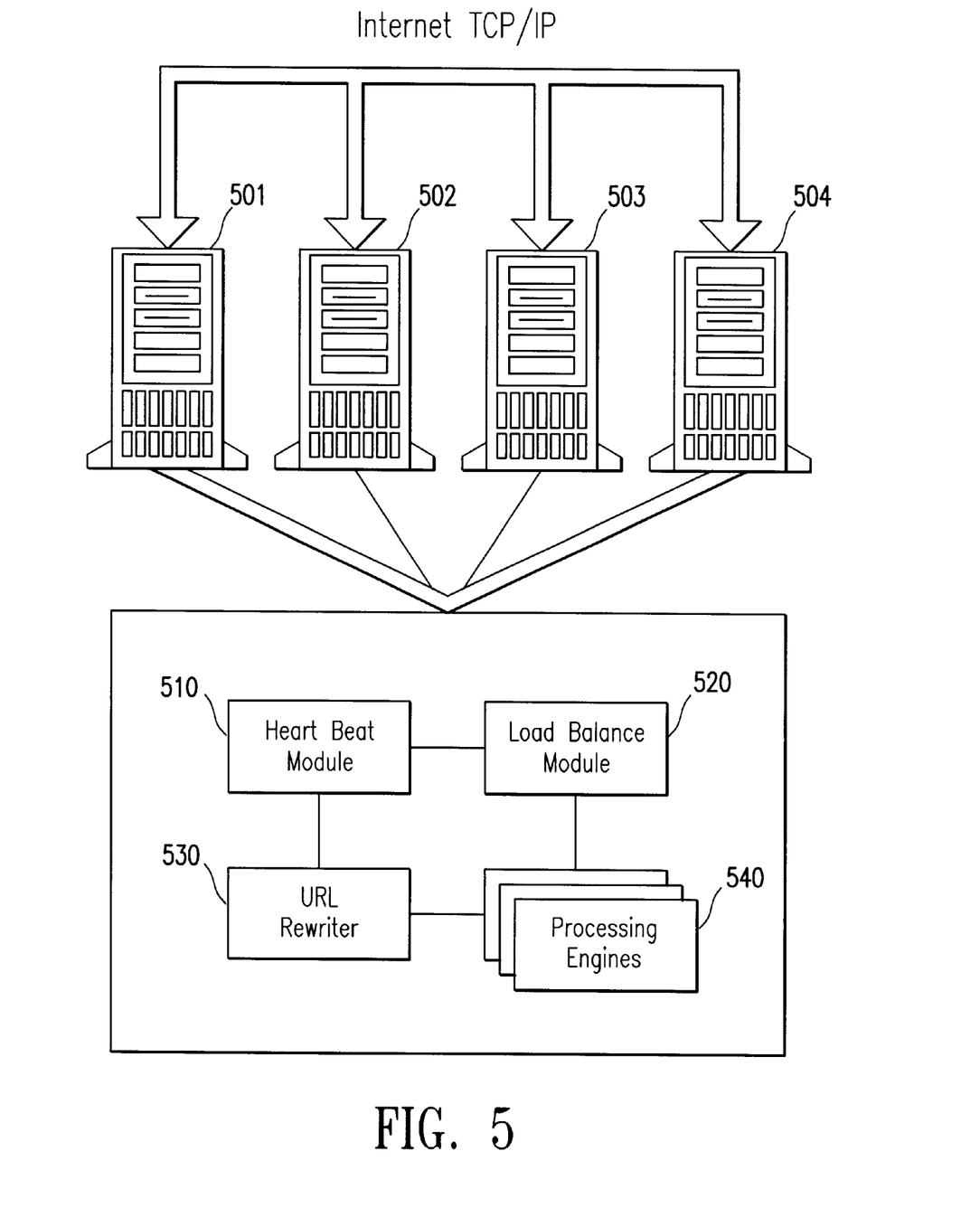
FIG. 5 is a block diagram of the Internet processor system according to one embodiment of the present invention.

FIG. 5 is a block diagram of an Internet processor system according to one embodiment of the present invention. As shown, Web servers 501–504 include processors for processing data. Also included in each of the Web servers 501–504 is a cache. As described above, the cache is used to store requested Web pages. Also shown in FIG. 5 are modules 510, 520 and 530 and processing engines 540. Although one set of modules is shown, each of the Web processors includes each of these modules and the processing engines. The modules and processing engines are interconnected and communicate with each other as described below.

Module 510 is the operative module. The operative module issues a signal to the other operative modules in the other Web processors. The purpose of the operative module 510 is to determine which of the Web processors is working. If it is determined that one of the Web processors is inoperable, no URL will be forwarded to that Web processor to retrieve cached data. According to one embodiment of the present invention, the status of each of the Web processors is placed in a table that is constantly updated. According to one embodiment of the present invention, the table can be updated as frequently or infrequently as desired. Each of the processors sets a flag in the table to indicate that it is working. A timer is used to reset the flags set by the processors. This timer resets the flags set by the processors as frequently or infrequently as desired to determine if a flag has been set. If after the timer resets the flag set by the processors and then checks for flags at a later time and determines that a flag has not been set by a particular processor, the system knows that that processor is off-line.

Module 520 is the load-balancing module. Load-balancing module 520 determines which of the Web processors is best suited to handle a Web request. The load-balancing module 520 returns an address of the Web server to the URL rewriter 530 as described below. Load-balancing module 520 first determines the load level of each of the operative Web processors. The determined load level may be compared with a predetermined threshold value to determine whether a Web processor can handle additional processing. If a Web processor has the requested cached data and its load level is below a predetermined threshold value, the address of that Web processor is sent to URL rewriter 530.

URL rewriter 530 is responsible for calling the load-balancing module 520 and rewriting image, sound and anchor references so as to call the lightest loaded, available machine, preferably with the URL in its cache. According to one embodiment of the present invention, the results of URL rewriter 530 may be sent to a reformatting module such as processing engines 540 such that the cached Web data may be displayed on a small screen device.

Figure 6:
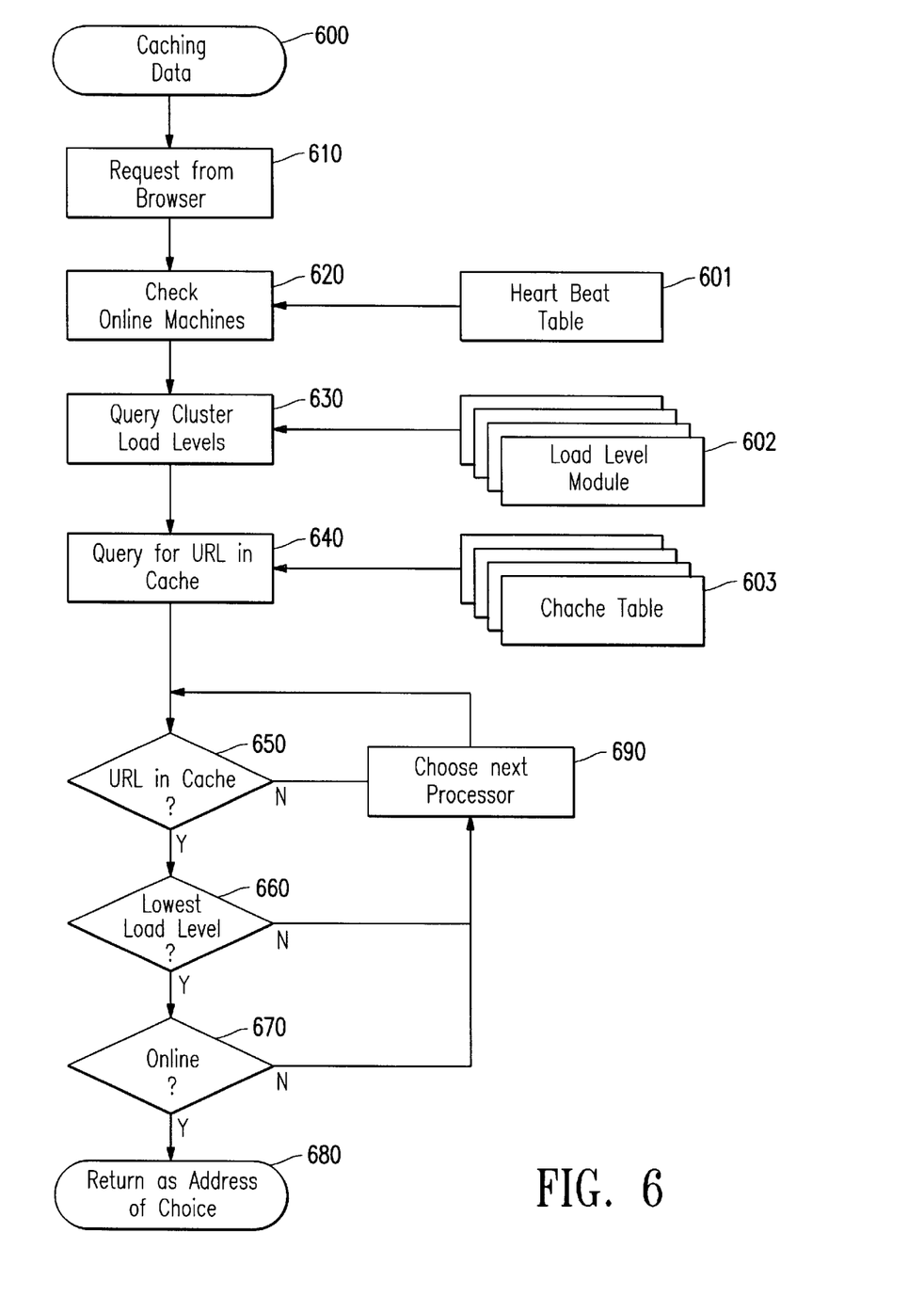
FIG. 6 is a flow diagram for retrieving a Web page in a multiple cache networking system according to one embodiment of the present invention.

FIG. 6 is a flow diagram illustrating the process for retrieving a Web page in a multiple cache networking system according to one embodiment of the present invention. The process begins at step 600 which depicts caching data requested to be cached by browsers among a plurality of processors in a multiple cache networking system. The process then passes to step 610, which illustrates receiving a request from a browser for cached data. The process passes to step 620, which illustrates determining which of the plurality of processors is operable. As shown, step 620 communicates with heart beat table 601 to determine which of the processors is operable. From step 620, the process then passes to step 630 which depicts querying a load level of the operative processors to determine which of the operative processors has the lowest load level. In determining the load level of the processors, the system also determines which of the processors operates at a full capacity. Alternatively, the system can determine which of the processors operates at a 30, 40, 50, 60 or 70 percent capacity. This operating capacity of the processors can be compared to a threshold value that is set by the system. The threshold value could be set such that a processor will not be selected if it is operating above an 80 percent capacity for example. According to the present invention, any such threshold value could be set by the system without departing from the spirit and scope of the present invention.

As shown, step 630 communicates with load level module 602 to determine which processor has the lowest load level. From step 630, the process then passes to step 640 which shows querying each of the operative processors for the requested cached data. Step 640 communicates with cache table 603 to determine which of the processors has the requested cache data. From step 640, the process then passes to decision step 650 which depicts deciding whether an operative processor has the requested cached data. If the operative processor has the requested cached data, the process passes to decision step 660 which depicts deciding whether the operative processor with the requested cached data has a load level that does not exceed a predetermined threshold value. If the operative processor with the requested cache data has a load level that does not exceed the predetermined threshold value the process passes to step 670 where it is determined whether the processor is operable or not. If the processor having the requested data and not exceeding the predetermined threshold value is operable, the address of this processor is forwarded to the URL rewriter 530 in step 680.

Alternatively, if at decision step 650, the operative processor does not have the requested cached data, the process passes to step 690 where another processor is selected. If at step 660, the operative processor with the requested cached data has a load level that exceeds the predetermined threshold value, the process again passes to step 690 where another processor is selected. If at step 670, the processor is not operable, the process returns to step 690 where another processor is selected.

According to an alternative embodiment of the present invention, if each of the processors has been queried and none of the processors has the requested data stored in its cache, then the operative processor having the lowest load level is selected to retrieve the requested data.

While the invention is described in conjunction with the preferred embodiments, this description is not intended in any way as a limitation to the scope of the invention. Modifications, changes, and variations which are apparent to those skilled in the art can be made in the arrangement, operation and details of construction of the invention disclosed herein without departing from the spirit and scope of the invention.

What is claimed is:

1. A method for retrieving a Web page in a multiple cache networking system, the method comprising the steps of:

caching data requested to be cached by browsers among a plurality of processors in a multiple cache networking system;

receiving a request from a browser for cached data;

determining which of the plurality of processors is operative;

querying a load level of the operative processors to determine which of the operative processors has the lowest load level;

querying each of the operative processors for the requested cached data; and outputting an address of the operative processor having the requested cached data.

2. The method according to claim 1 further comprising the steps of:

determining whether the load level of the operative processor having the requested cached data exceeds a predetermined threshold value; and if the load level of the operative processor having the requested cached data does not exceed the threshold value, outputting an address of the operative processor having the lowest load level.

3. The method according to claim 1, wherein the step of caching data requested to be cached by browsers among a plurality of processors includes caching one copy of the data in one of the plurality of processors.

4. The method according to claim 1, wherein the step of querying the load level of the operative processors includes the step of determining which of the operative processors are operating at a full capacity.

5. The method according to claim 1 further comprising the step of outputting an address of the processor with the lowest load level.

6. The method according to claim 1, wherein the determining step includes the step of reading flag values from a table.

7. The method according to claim 6 further comprising the step of storing the flag values in the table.

8. The method according to claim 6, wherein the reading step reads the values in the table periodically.

9. An Internet processor system comprising a plurality of processors wherein each processor includes:

a cache for caching requested data;

an operating module for determining which of the processors are operating;

a load balancing module for determining which processors have the requested cached data and determining which one of the processors has the lowest operating level; and a rewriter module for rewriting cached data in a markup language.

10. The Internet processor system according to claim 9, wherein the cache stores requested cache data from a plurality of browsers communicating with the Internet.

11. The Internet processor system according to claim 9, wherein the operating module stores data in a table.

12. The Internet processor system according to claim 9, wherein the load balancing module outputs an address of the processor having the requested cached data.

13. The Internet processor system according to claim 12, wherein the load balancing module outputs an address of the processor having the requested cached data and a load level below a predetermined threshold value.

14. The Internet processor system according to claim 12, wherein the load balancing module outputs an address of the processor having the lowest load level.

15. The Internet processor system according to claim 11, wherein each processor sets a flag in the table.

16. The Internet processor system according to claim 15, wherein the table is a heart beat table.

17. The Internet processor system according to claim 15, wherein the values stored in the table are reset periodically.

18. The Internet processor system according to claim 9, wherein the rewriter module rewrites image, sound and anchor references.

19. The Internet processor system according to claim 9, wherein the rewriter module communicates with a reformatting module to reformat the requested cached data.

20. A machine-readable medium having processing instructions stored thereon for execution by a processor to perform a method comprising:

caching data requested to be cached by browsers among a plurality of processors in a multiple cache networking system;

receiving a request from a browser for cached data;

determining which of the plurality of processors is operative;

querying a load level of the operative processors to determine which of the operative processors has the lowest load level;

querying each of the operative processors for the requested cached data; and outputting an address of the operative processor having the requested cached data.

* * * * *